(12) United States Patent
Griffin et al.

(10) Patent No.: US 7,430,439 B2
(45) Date of Patent: Sep. 30, 2008

(54) USER HAND DETECTION FOR WIRELESS DEVICES

(75) Inventors: Jason Griffin, Waterloo (CA); Steven Fyke, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 588 days.

(21) Appl. No.: 11/045,072

(22) Filed: Jan. 31, 2005

(65) Prior Publication Data
US 2006/0172706 A1    Aug. 3, 2006

(51) Int. Cl.
*H04M 1/00*    (2006.01)
(52) U.S. Cl. ............... 455/552.1; 455/550.1; 455/573; 455/572; 455/575.3
(58) Field of Classification Search ............ 455/67.11, 455/552.1, 550.1, 573, 475.3; 250/205
See application file for complete search history.

(56) References Cited

U.S. PATENT DOCUMENTS

| | | | |
|---|---|---|---|
| 6,549,792 B1 | 4/2003 | Cannon et al. | |
| 7,224,996 B2 | 5/2007 | Sakamoto | |
| 2004/0243324 A1 | 12/2004 | Nunokawa et al. | |
| 2005/0145774 A1* | 7/2005 | Yang et al. | 250/205 |
| 2005/0161241 A1* | 7/2005 | Frauhammer et al. | 173/1 |

FOREIGN PATENT DOCUMENTS

| | | |
|---|---|---|
| DE | 102 59 576 A1 | 7/2004 |
| EP | 1 063 837 A | 12/2000 |
| EP | 1 376 992 A | 1/2004 |
| JP | 08329015 | 4/1997 |
| JP | 11068891 | 6/1999 |
| JP | 02000249772 A * | 9/2000 |

* cited by examiner

*Primary Examiner*—Yuwen Pan
(74) *Attorney, Agent, or Firm*—Ogilvy Renault LLP

(57) ABSTRACT

A method for determining whether a wireless device is being held comprising: activating a vibration motor in the wireless device to vibrate the wireless device for a predetermined period; receiving at least one acceleration measurement from an accelerometer in the wireless device during the predetermined period; and, comparing the at least one acceleration measurement to at least one stored acceleration measurement, the at least one stored acceleration measurement corresponding to a held wireless device.

27 Claims, 4 Drawing Sheets

USER HAND DETECTION FOR WIRELESS DEVICES

FIELD OF THE INVENTION

This invention relates to the field of user hand detection for wireless devices, and more specifically, to user hand detection for wireless devices using on-board accelerometers and vibration motors.

BACKGROUND

Current wireless mobile communication devices include microprocessors, memory, soundcards, and run one or more software applications. Examples of software applications used in these wireless devices include micro-browsers, address books, email clients, and wavetable instruments. Additionally, wireless devices have access to a plurality of services via the Internet. A wireless device may, for example, be used to browse web sites on the Internet, to transmit and receive graphics, and to execute streaming audio and/or video applications. The transfer of Internet content to and from wireless device is typically facilitated by the Wireless Application Protocol ("WAP"), which integrates the Internet and other networks with wireless network platforms. Such wireless devices include, for example, the BlackBerry® handheld developed by Research In Motion Ltd. (RIM®).

Wireless devices communicate with each other and over wireless networks. Typically, wireless networks are maintained by wireless carriers. A wireless carrier or wireless network operator typically owns and operates a wireless network including radio equipment, base stations, antennae, interface equipment, servers, associated landlines, etc. A carrier also manages basic billing and other back-end services needed to sell wireless services to subscribers. Each wireless network can be based one of several different wireless standards or technologies including Code-Division Multiple Access ("CDMA"), General Packet Radio Service ("GPRS"), Mobitex, and Motorola's Integrated Digital Enhanced Network ("iDEN") and DataTAC™ networks.

However, one shortcoming of present wireless devices is that they cannot effectively determine the nature of their physical surroundings. In particular, present wireless devices cannot effectively determine if they are being held by users.

A need therefore exists for an improved method and system for wireless devices to detect when they are being held by users. Accordingly, a solution that addresses, at least in part, the above and other shortcomings is desired.

SUMMARY

According to one aspect of the invention, there is provided a method for determining whether a wireless device is being held comprising: activating a vibration motor in the wireless device to vibrate the wireless device for a predetermined period; receiving at least one acceleration measurement from an accelerometer in the wireless device during the predetermined period; and, comparing the at least one acceleration measurement to at least one stored acceleration measurement, the at least one stored acceleration measurement corresponding to a held wireless device.

Preferably, the at least one acceleration measurement and the at least one stored acceleration measurement are an acceleration pattern and a stored acceleration pattern, respectively.

Preferably, the held wireless device is held by a user.

Preferably, the held wireless device is held by a holster.

Preferably, the method further includes adjusting a feature of the wireless device in response to the comparing.

Preferably, the feature is at least one of a ring tone, a display screen time-out, and a display screen illumination intensity.

Preferably, the vibration motor and the accelerometer are at least one vibration motor and at least one accelerometer, respectively.

According to another aspect of the invention, there is provided a method for controlling a feature of a wireless device comprising: determining whether the wireless device is being held by: activating a vibration motor in the wireless device to vibrate the wireless device for a predetermined period; receiving at least one acceleration measurement from an accelerometer in the wireless device during the predetermined period; and, comparing the at least one acceleration measurement to at least one stored acceleration measurement, the at least one stored acceleration measurement corresponding to a held wireless device; and, adjusting the feature in response to the determining.

According to another aspect of the invention, there is provided a wireless device comprising: a processor coupled to memory, a vibration motor, and an accelerometer and adapted for: determining whether the wireless device is held by: activating the vibration motor to vibrate the wireless device for a predetermined period; receiving at least one acceleration measurement from the accelerometer during the predetermined period; and, comparing the at least one acceleration measurement to at least one stored acceleration measurement, the at least one stored acceleration measurement corresponding to a held wireless device.

According to another aspect of the invention, there is provided a method for determining a restraining force on a wireless device comprising: activating a vibration motor in the wireless device to vibrate the wireless device for a predetermined period; receiving at least one acceleration measurement from an accelerometer in the wireless device during the predetermined period; and, comparing the at least one acceleration measurement to at least one stored acceleration measurement, the at least one stored acceleration measurement corresponding to the restraining force.

In accordance with further aspects of the present invention there is provided an apparatus such as a wireless device, a method for adapting this device, a computer program product, as well as articles of manufacture such as a computer readable medium having program instructions recorded thereon for practising the method of the invention.

BRIEF DESCRIPTION OF THE DRAWINGS

Further features and advantages of the embodiments of the present invention will become apparent from the following detailed description, taken in combination with the appended drawings, in which.

DETAILED DESCRIPTION OF THE PREFERRED EMBODIMENTS

The following detailed description of the embodiments of the present invention does not limit the implementation of the invention to any particular computer programming language. The present invention may be implemented in any computer programming language provided that the operating system ("OS") provides the facilities that may support the requirements of the present invention. A preferred embodiment is implemented in the JAVA™ computer programming language (or other computer programming languages such as C or C++). (JAVA and all JAVA-based trademarks are the trademarks of Sun Microsystems Corporation.) Any limitations presented would be a result of a particular type of operating system or computer programming language and would not be a limitation of the present invention.

Figure 1:
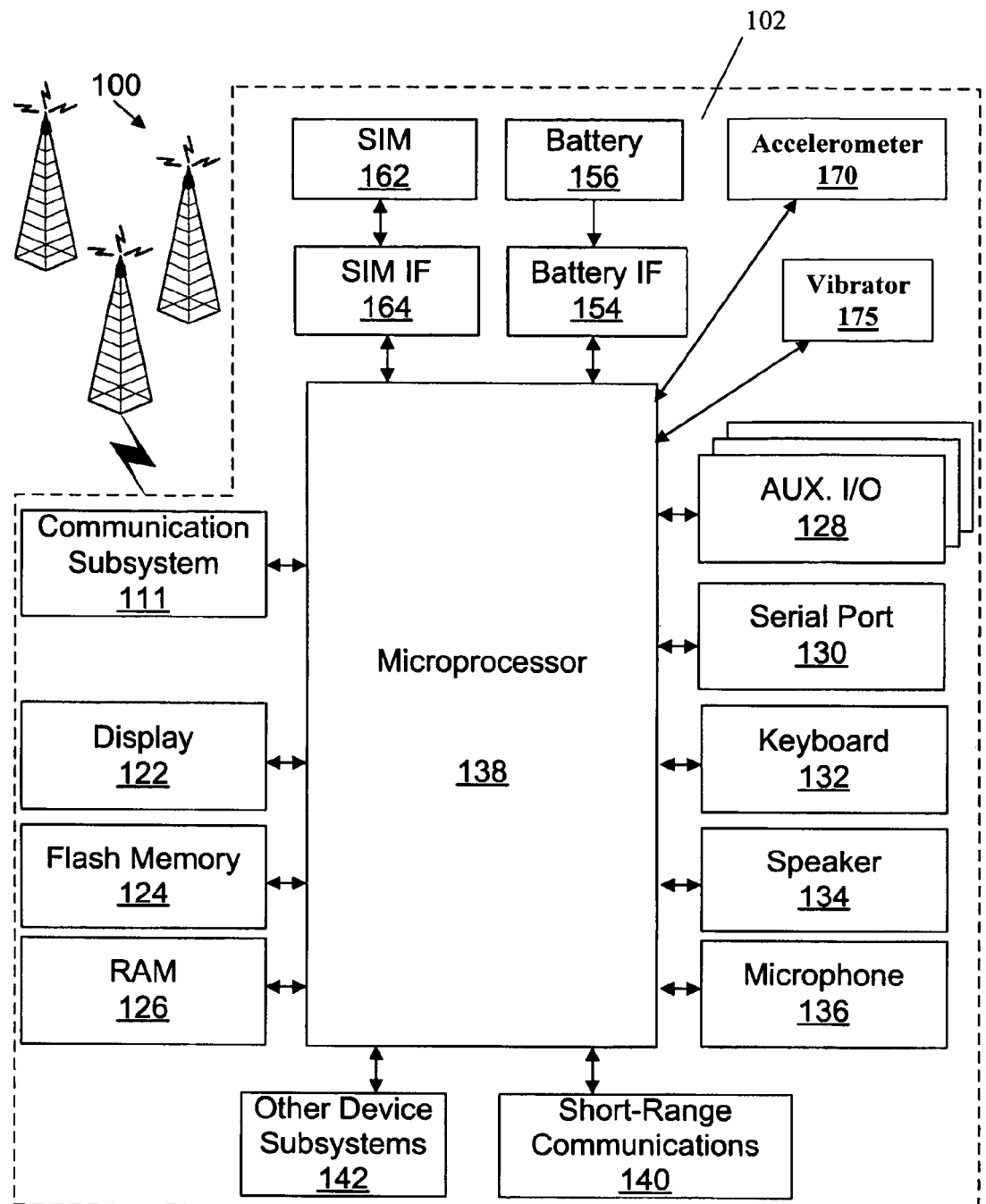
FIG. 1 is a block diagram illustrating an exemplary wireless device adapted in accordance with an embodiment of the invention.

FIG. 1 is a block diagram illustrating an exemplary wireless device 102 and wireless network 100 adapted in accordance with an embodiment of the invention. Typically, the wireless device 102 is a handheld device 102. The wireless network 100 includes antenna, base stations, and supporting radio equipment, known to those of ordinary skill in the art, for supporting wireless communications between the wireless device 102 and other wireless devices and systems (not shown). The wireless network 100 may be coupled to a wireless network gateway (not shown) and to a wide area network (not shown) to which the other systems (not shown) may be coupled through appropriate interfaces (not shown).

The wireless device 102 is a two-way communication device having at least voice and advanced data communication capabilities, including the capability to communicate with other computer systems. Depending on the functionality provided by the device 102, it may be referred to as a data messaging device, a two-way pager, a cellular telephone with data messaging capabilities, a wireless Internet appliance, or a data communication device (with or without telephony capabilities). The device 102 may communicate with any one of a plurality of fixed transceiver stations 100 within its geographic coverage area.

The wireless device 102 will normally incorporate a communication subsystem 111, which includes a RF receiver, a RF transmitter, and associated components, such as one or more (preferably embedded or internal) antenna elements and, local oscillators ("LOs"), and a processing module such as a digital signal processor ("DSP") (all not shown). As will be apparent to those skilled in field of communications, particular design of the communication subsystem 111 depends on the communication network 100 in which the device 102 is intended to operate.

Network access is associated with a subscriber or user of the device 102 and therefore the device 102 requires a Subscriber Identity Module (or "SIM" card) 162 to be inserted in a SIM interface ("IF") 164 in order to operate in the network. The device 102 is a battery-powered device so it also includes a battery IF 154 for receiving one or more rechargeable batteries 156. Such a battery 156 provides electrical power to most if not all electrical circuitry in the device 102, and the battery IF 154 provides for a mechanical and electrical connection for it. The battery IF 154 is coupled to a regulator (not shown) which provides power to the circuitry of the device 102.

The wireless device 102 includes a microprocessor (or central processing system ("CPU")) 138 which controls overall operation of the device 102. Communication functions, including at least data and voice communications, are performed through the communication subsystem 111. The microprocessor 138 also interacts with additional device subsystems such as a display 122, a flash memory 124 or other persistent store, a random access memory ("RAM") 126, auxiliary input/output ("I/O") subsystems 128, a serial port 130, a keyboard 132, a speaker 134, a microphone 136, a short-range communications subsystem 140, and any other device subsystems generally designated at 142. Some of the subsystems shown in FIG. 2 perform communication-related functions, whereas other subsystems may provide "resident" or on-device functions. Notably, some subsystems, such as the keyboard 132 and display 122, for example, may be used for both communication-related functions, such as entering a text message for transmission over a communication network, and device-resident functions such as a calculator or task list. Operating system software used by the microprocessor 138 is preferably stored in a persistent store such as the flash memory 124, which may alternatively be a read-only memory ("ROM") or similar storage element (not shown). Those skilled in the art will appreciate that the operating system, specific device applications, or parts thereof, may be temporarily loaded into a volatile store such as RAM 126.

The microprocessor 138, in addition to its operating system functions, preferably enables execution of software applications on the device 102. A predetermined set of applications which control basic device operations, including at least data and voice communication applications, will normally be installed on the device 102 during its manufacture. A preferred application that may be loaded onto the device 102 may be a personal information manager ("PIM") application having the ability to organize and manage data items relating to the user such as, but not limited to, instant messaging ("IM"), email, calendar events, voice mails, appointments, and task items. Naturally, one or more memory stores are available on the device 102 and SIM 162 to facilitate storage of PIM data items and other information.

The PIM application preferably has the ability to send and receive data items via the wireless network 100. In a preferred embodiment, PIM data items are seamlessly integrated, synchronized, and updated via the wireless network 100, with the user's corresponding data items stored and/or associated with a host computer system (not shown) thereby creating a mirrored host computer on the device 102 with respect to such items. This is especially advantageous where the host computer system is the user's office computer system (not shown). Additional applications may also be loaded onto the device 102 through the network 100, an auxiliary I/O subsystem 128, serial port 130, short-range communications subsystem 140, or any other suitable subsystem 142, and installed by a user in RAM 126 or preferably in a non-volatile store (not shown) for execution by the microprocessor 138. Such flexibility in application installation increases the functionality of the device 102 and may provide enhanced on-device functions, communication-related functions, or both. For example, secure communication applications may enable electronic commerce functions and other such financial transactions to be performed using the wireless device 102.

In a data communication mode, a received signal such as a text message, an email message, or web page download will be processed by the communication subsystem 111 and input to the microprocessor 138. The microprocessor 138 will preferably further process the signal for output to the display 122 and/or to the auxiliary I/O device 128. A user of the wireless device 102 may also compose data items, such as email messages, for example, using the keyboard 132 in conjunction with the display 122 and possibly the auxiliary I/O device 128. The keyboard 132 is preferably a complete alphanumeric keyboard and/or telephone-type keypad. These composed items may be transmitted over a communication network 100 through the communication subsystem 111 or the short range communication subsystem 140.

For voice communications, the overall operation of the wireless device 102 is substantially similar, except that the received signals would be output to the speaker 134 and signals for transmission would be generated by the microphone 136. Alternative voice or audio I/O subsystems, such as a voice message recording subsystem, may also be implemented on the device 102. Although voice or audio signal output is preferably accomplished primarily through the speaker 134, the display 122 may also be used to provide, for example, an indication of the identity of a calling party, duration of a voice call, or other voice call related information.

Figure 2:
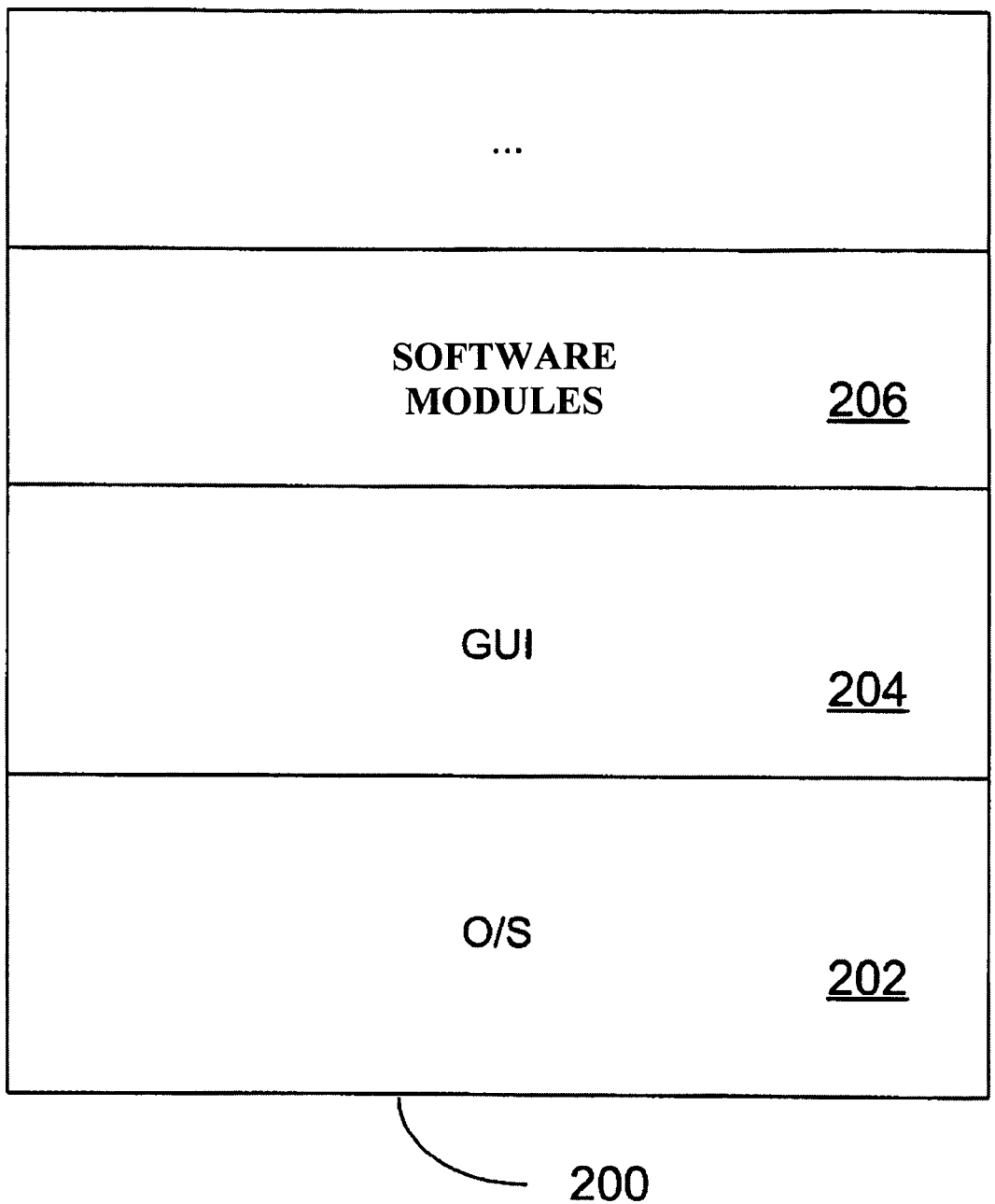
FIG. 2 is a block diagram illustrating a memory of the wireless device of FIG. 1. in accordance with an embodiment of the invention.

The serial port 130 shown in FIG. 2 is normally implemented in a personal digital assistant ("PDA")-type communication device for which synchronization with a user's desktop computer is a desirable, albeit optional, component. The serial port 130 enables a user to set preferences through an external device or software application and extends the capabilities of the device 102 by providing for information or software downloads to the device 102 other than through a wireless communication network 100. The alternate download path may, for example, be used to load an encryption key onto the device 102 through a direct and thus reliable and trusted connection to thereby provide secure device communication.

The short-range communications subsystem 140 shown in FIG. 1 is an additional optional component which provides for communication between the device 102 and different systems or devices (not shown), which need not necessarily be similar devices. For example, the subsystem 140 may include an infrared device and associated circuits and components, or a Bluetooth™ communication module to provide for communication with similarly-enabled systems and devices. Bluetooth™ is a registered trademark of Bluetooth SIG, Inc.

The SIM card 162 is a small, stamp-sized "smart card" that is used in a Global System for Mobile Communications ("GSM") wireless device 102. Typically, the SIM contains a microchip that stores data that identifies the wireless device 102 to a carrier or service provider. The SIM also stores data used to encrypt voice and data transmissions, phone book information, etc. Typically, the SIM can be removed from a first wireless device and placed in a second wireless device. This enables the second wireless device to use information such as the subscriber's telephone and account numbers. The interface between a SIM and the wireless device 102 within a wireless network 100 is defined in European Telecommunications Standards Institute ("ETSI") standard GSM 11.11 Version 6.2.0 Release 1997 ("Digital Cellular Telecommunications System (Phase 2+); Specification of the Subscriber Identity Module—Mobile Equipment (SIM—ME) Interface"), which is incorporated herein by reference. A carrier can be uniquely identified through the Mobile Country Code ("MCC") and Mobile Network Code ("MNC") assigned to the subscriber and stored in the International Mobile Subscriber Identity ("IMSI") file in the SIM of the subscriber's wireless device 102. The wireless network 100 can include Code-Division Multiple Access ("CDMA"), General Packet Radio Service ("GPRS"), Mobitex, and Motorola's Integrated Digital Enhanced Network ("iDEN") and DataTACT™ networks.

FIG. 2 is a block diagram illustrating a memory 200 of the wireless device 102 of FIG. 1 in accordance with an embodiment of the invention. The memory 200 has various software components for controlling the device 102 and may include flash memory 124, RAM 126, or ROM (not shown), for example. In accordance with an embodiment of the invention, the wireless device 102 is intended to be a multi-tasking wireless communications device configured for sending and receiving data items and for making and receiving voice calls. To provide a user-friendly environment to control the operation of the device 102, an operating system ("OS") 202 resident on the device 102 provides a basic set of operations for supporting various applications typically operable through a graphical user interface ("GUI") 204. For example, the OS 202 provides basic input/output system features to obtain input from the auxiliary I/O 128, keyboard 132, and the like, and for facilitating output to the user. In accordance with an embodiment of the invention, there are provided software modules 206 for determining whether the wireless device is being held in a user's hand as will be described below. Though not shown, one or more applications for managing communications or for providing personal digital assistant like functions may also be included.

Thus, the wireless device 102 includes computer executable programmed instructions for directing the device 102 to implement the embodiments of the present invention. The programmed instructions may be embodied in one or more software modules 206 resident in the memory 200 of the wireless device 102. Alternatively, the programmed instructions may be embodied on a computer readable medium (such as a CD disk or floppy disk) which may be used for transporting the programmed instructions to the memory 200 of the wireless device 102. Alternatively, the programmed instructions may be embedded in a computer-readable, signal-bearing medium that is uploaded to a network by a vendor or supplier of the programmed instructions, and this signal-bearing medium may be downloaded through an interface 111, 130, 140 to the wireless device 102 from the network by end users or potential buyers.

Figure 3:
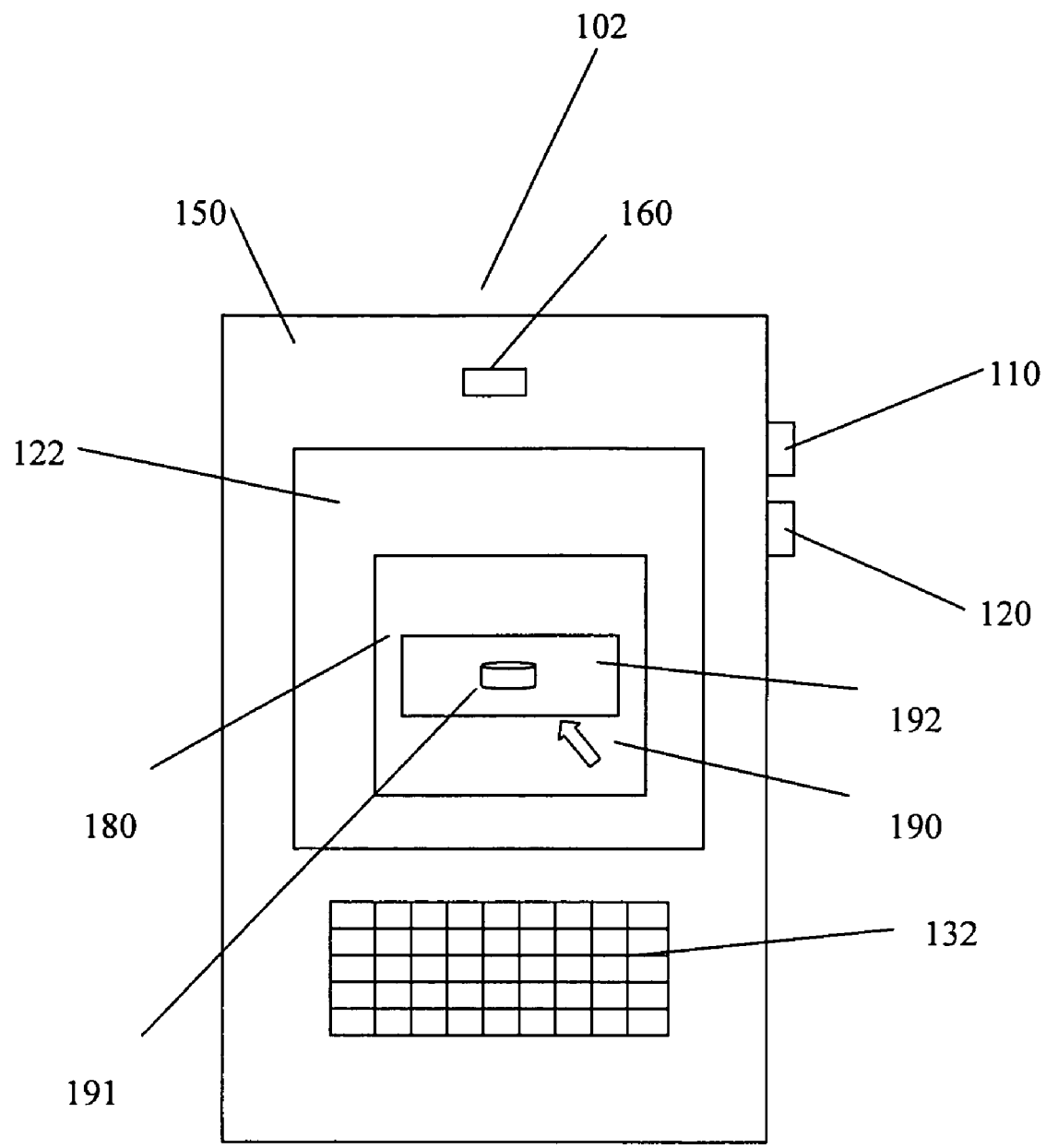
FIG. 3 is a front view illustrating the wireless device of FIG. 1 in accordance with an embodiment of the invention; and, FIG. 4 is a flow chart illustrating operations of modules within a wireless device for determining whether the wireless device is being held (e.g., in a user's hand, etc.) in accordance with an embodiment of the invention.

FIG. 3 is a front view illustrating the wireless device 102 of FIG. 1 in accordance with an embodiment of the invention. As mentioned above, the wireless device 102 can be a data and voice-enabled handheld device. The wireless device 102 includes a casing 150, a display screen 122, a graphical user interface ("GUI") 180, a keyboard (or keypad) 132, a thumbwheel (or trackwheel) 110, various select buttons 120, and various signal inputs/outputs 160 (e.g., power connector input, microphone, speaker, data interface input, etc.). Internally, the wireless device 102 includes one or more circuit boards, a CPU 138, memory 200, a battery 156, an antenna, etc. (not shown) which are coupled to the signal inputs/outputs 160, keyboard 132, display screen 122, etc.

The microprocessor 138 of the wireless device 102 is typically coupled to one or more devices 110, 120, 132 for receiving user commands or queries and for displaying the results of these commands or queries to the user on the display 122. For example, user queries may be transformed into a combination of SQL commands for producing one or more tables of output data which may be incorporated in one or more display pages for presentation to the user. The microprocessor 138 is coupled to memory 200 for containing software modules 206 and data such as base tables or virtual tables such as views or derived tables. As mentioned, the memory 200 may include a variety of storage devices typically arranged in a hierarchy of storage as understood to those skilled in the art.

A user may interact with the wireless device 102 and its software modules 206 using the graphical user interface ("GUI") 180. GUIs are supported by common operating systems and provide a display format which enables a user to choose commands, execute application programs, manage computer files, and perform other functions by selecting pictorial representations known as icons, or items from a menu through use of an input or pointing device such as a thumbwheel 110 and keyboard 132. In general, a GUI is used to convey information to and receive commands from users and generally includes a variety of GUI objects or controls, including icons, toolbars, drop-down menus, pop-up menus, text, dialog boxes, buttons, and the like. A user typically interacts with a GUI 180 presented on a display 122 by using an input or pointing device (e.g., a thumbwheel) 110 to position a pointer or cursor 190 over an object 191 (i.e., "pointing" at the object) and by "clicking" on the object 191. (e.g., by depressing the thumbwheel 110 or other button). This is often referred to as a point-and-click operation or a selection operation. Typically, the object 191 may be hi-lighted (e.g., shaded) when it is pointed at.

Typically, a GUI based system presents application, system status, and other information to the user in "windows" appearing on the display 122. A window 192 is a more or less rectangular area within the display 122 in which a user may view an application or a document. Such a window 192 may be open, closed, displayed full screen, reduced to an icon, increased or reduced in size, or moved to different areas of the display 122. Multiple windows may be displayed simultaneously, such as: windows included within other windows, windows overlapping other windows, or windows tiled within the display area.

The present invention provides a method and system for determining whether a wireless device 102 is being held in a user's hand. Referring again to FIG. 1, in accordance with the present invention, the wireless device 102 includes an accelerometer 170 and a vibration motor or vibrator 175. Each of the accelerometer 170 and vibrator 175 are coupled to the microprocessor 138 either directly or through intermediary I/O circuitry 128. Each of the accelerometer 170 and vibrator 175 may include respective local controllers or drivers (not shown). Under the control of software modules 206, the microprocessor 138 sends ON/OFF control messages to the vibrator 175 and reads output messages from the accelerometer 170.

The accelerometer 170 may be a based on piezoelectric, piezioresistive, micromechanical capacitive, or micro-electrical mechanical systems ("MEMS") technology. A MEMS accelerometer may be mounted on a circuit board within the wireless device 102. MEMS accelerometers may be based on bulk micromachined, surface micromachined, and thermal bulk/micromachined technology. For example, a thermal-based MEMS accelerometer has no moving parts. Its principle of operation is based on differential thermal sensing of a heated gas inside a hermetic component. With no moving parts, such an accelerometer is capable of surviving the high shocks typically experienced by wireless devices, both in the field and during production. Typically, a single MEMS accelerometer can measure accelerations along two orthogonal axes. Thus, two MEMS accelerometers positioned orthogonal to each other can provide complete three axis motion information. While accelerometers output acceleration measurements and not position measurements, if position measurements are required these can be calculated by double integration of the acceleration measurements.

The vibration motor or vibrator 175 typically includes a motor driver (not shown). The vibration motor may be a cylindrical motor or a pancake/coin motor as know to those of ordinary skill in the art of vibration motors for wireless devices. According to one embodiment of the invention, the vibration motor or vibrator 175 is any device capable of producing a vibration such as a piezoelectric vibration generation device.

By combining an on-board accelerometer 170 with an on-board vibrator 175, wireless devices 102 are given the means required to detect if they are being held by users. If a wireless device 102 is on a table or is in a user's pocket and is not being held by anyone, the accelerometer 170 can predictably measure the acceleration pattern that occurs when the vibrator 175 is turned on. Acceleration patterns differ when a wireless device 102 is being held by a person and when it is not being held.

In particular, the acceleration patterns that are measured by the accelerometer 170 reflect the effective mass seen by the vibrator 175. When the wireless device 102 is being held, the effective mass is greater as it includes the mass of the wireless device 102 and that of the user's hand and arm, etc. Thus, the wireless device 102 can determine if it is being held by turning on its vibrator 175 for a predetermined period of time and by reading the output of its accelerometer 170. The output of the accelerometer 170 may be combined with the outputs of other on-board sensors such as capacitive sensors or touch-screens, light sensors, strain gauges, etc., to determine further information concerning the surroundings of the wireless device 102.

The microprocessor 138 of the wireless device 102 reads the output of the accelerometer 170 over the predetermined time period to generate an acceleration pattern. This acceleration pattern is then compared to one or more predetermined acceleration patterns that are stored in the memory 200 of the wireless device 102. The predetermined acceleration patterns include patterns corresponding to a held wireless device and a non-held wireless device. If the acceleration pattern corresponds to a predetermined acceleration pattern for a held wireless device, within a predetermined margin of error, then the microprocessor 138 determines that the wireless device 102 is being held by a user.

For example, if the wireless device 102 was placed on a table and the vibrator 175 was activated, the accelerometer 170 would measure a first acceleration pattern which the wireless device 102 could store in its memory 200. Now, if the wireless device 102 was picked up and held in the hand of user and the vibrator 175 was again activated, the accelerometer 170 would measure a second acceleration pattern which the wireless device could again store in its memory 200. Typically, the second acceleration pattern would have acceleration measurements having larger magnitudes than those of the first acceleration pattern. By comparing the first and second acceleration patterns, the wireless device 102 can determine if it is being held by a user.

Advantageously, with the present invention a wireless device 102 is able to determine information pertaining to its surrounding environment and adjust its operation accordingly. For example, if a wireless device 102 is aware that it is in its holster, it can shut off its display screen 122 in order to improve battery life. Similarly, it is advantageous for a wireless device 102 to know if it is being held in a user's hand. For example, if a wireless device 102 determines that it is in a user's hand, it can change its operational state or profile in response. In particular, the wireless device can vibrate upon receipt of message if it is in a user's hand and it could sound a ring tone if it is not in a user's hand. Similarly, timeouts for the display screen 122 of the wireless device 102 can be set differently depending on whether the wireless device 102 is presently in a user's hand or not (e.g., a slower screen timeout can be used if the wireless device 102 is being held by a user).

According to one embodiment of the invention, several predetermined acceleration patterns are stored in the memory 200 of the wireless device 102 for comparing to a currently measured acceleration pattern. The stored acceleration patterns may include patterns corresponding to a held wireless device (as described above), a non-held wireless device (as described above), a wireless device in its holster, a wireless device on a table, a wireless device in a pocket, etc. By comparing the currently measured acceleration pattern to these stored patterns, the degree by which the wireless device 102 is being restrained (i.e., the restraining force) may be determined.

Figure 4:
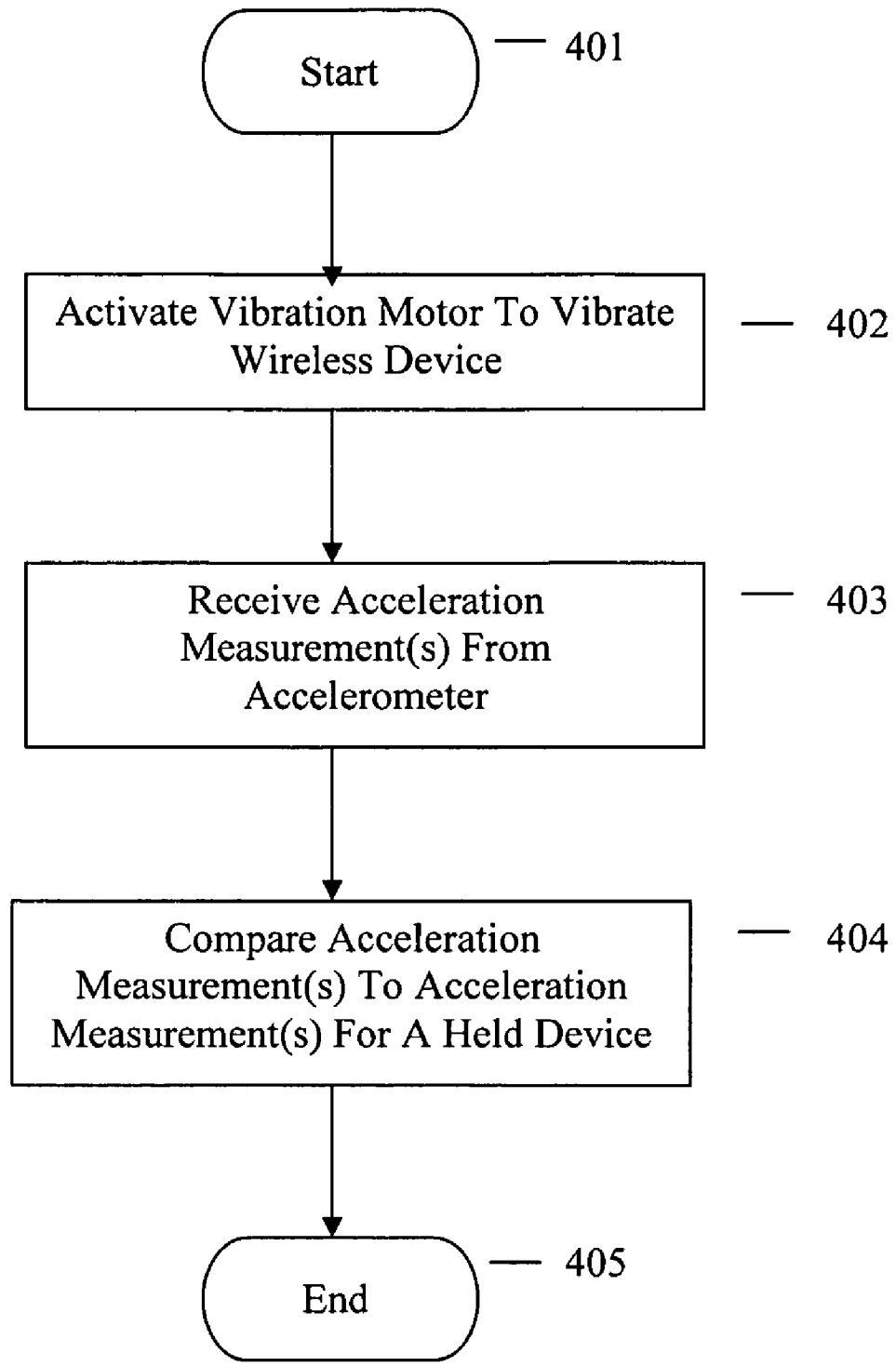

The above described method may be summarized with the aid of a flowchart. FIG. 4 is a flow chart illustrating operations 400 of modules 206 within a wireless device 102 for determining whether the wireless device 102 is being held (e.g., in a user's hand, etc.) in accordance with an embodiment of the invention.

At step 401, the operations 400 start.

At step 402, a vibration motor (or vibrator) 175 in the wireless device 102 is activated to vibrate the wireless device 102 for a predetermined period.

At step 403, at least one acceleration measurement from an accelerometer 170 in the wireless device 102 is received during the predetermined period.

At step 404, the at least one acceleration measurement is compared to at least one stored acceleration measurement, the at least one stored acceleration measurement corresponding to a held wireless device. Preferably, the at least one acceleration measurement and the at least one stored acceleration measurement are an acceleration pattern and a stored acceleration pattern, respectively. Preferably, the held wireless device is held by a user. Preferably, the held wireless device is held by a holster. Preferably, the method further includes adjusting a feature of the wireless device 102 in response to the comparing. Preferably, the feature is at least one of a ring tone 134, a display screen 122 time-out, and a display screen 122 illumination intensity. Preferably, the vibration motor 175 and the accelerometer 170 are at least one vibration motor (e.g. multiple axes motors) and at least one accelerometer (e.g. multiple axes accelerometers), respectively.

At step 405, the operations 400 end.

While this invention is primarily discussed as a method, a person of ordinary skill in the art will understand that the apparatus discussed above with reference to a wireless device 102, may be programmed to enable the practice of the method of the invention. Moreover, an article of manufacture for use with a wireless device 102, such as a pre-recorded storage device or other similar computer readable medium including program instructions recorded thereon, may direct the wireless device 102 to facilitate the practice of the method of the invention. It is understood that such apparatus and articles of manufacture also come within the scope of the invention.

The embodiments of the invention described above are intended to be exemplary only. The scope of the invention is therefore intended to be limited solely by the scope of the appended claims.

What is claimed is:

1. A method for determining whether a wireless device is being held comprising:
    activating a vibration motor in the wireless device to vibrate the wireless device for a predetermined period;
    receiving at least one acceleration measurement from an accelerometer in the wireless device during the predetermined period; and,
    comparing the at least one acceleration measurement to at least one stored acceleration measurement, the at least one stored acceleration measurement corresponding to a held wireless device.

2. The method of claim 1 wherein the at least one acceleration measurement and the at least one stored acceleration measurement are an acceleration pattern and a stored acceleration pattern, respectively.

3. The method of claim 1 wherein the held wireless device is held by a user.

4. The method of claim 1 wherein the held wireless device is held by a holster.

5. The method of claim 1 and further comprising adjusting a feature of the wireless device in response to the comparing.

6. The method of claim 5 wherein the feature is at least one of a ring tone, a display screen time-out, and a display screen illumination intensity.

7. The method of claim 1 wherein the vibration motor and the accelerometer are at least one vibration motor and at least one accelerometer, respectively.

8. A method for controlling a feature of a wireless device comprising:
    determining whether the wireless device is being held by:
        activating a vibration motor in the wireless device to vibrate the wireless device for a predetermined period; receiving at least one acceleration measurement from an accelerometer in the wireless device during the predetermined period; and, comparing the at least one acceleration measurement to at least one stored acceleration measurement, the at least one stored acceleration measurement corresponding to a held wireless device; and,
    adjusting the feature in response to the determining.

9. The method of claim 8 wherein the at least one acceleration measurement and the at least one stored acceleration measurement are an acceleration pattern and a stored acceleration pattern, respectively.

10. The method of claim 8 wherein the held wireless device is held by a user.

11. The method of claim 8 wherein the held wireless device is held by a holster.

12. The method of claim 8 wherein the feature is at least one of a ring tone, a display screen time-out, and a display screen illumination intensity.

13. The method of claim 8 wherein the vibration motor and the accelerometer are at least one vibration motor and at least one accelerometer, respectively.

14. A wireless device comprising:
    a processor coupled to memory, a vibration motor, and an accelerometer and adapted for:
    determining whether the wireless device is held by:
        activating the vibration motor to vibrate the wireless device for a predetermined period; receiving at least one acceleration measurement from the accelerometer during the predetermined period; and, comparing the at least one acceleration measurement to at least one stored acceleration measurement, the at least one stored acceleration measurement corresponding to a held wireless device.

15. The wireless device of claim 14 wherein the at least one acceleration measurement and the at least one stored acceleration measurement are an acceleration pattern and a stored acceleration pattern, respectively.

16. The wireless device method of claim 14 wherein the held wireless device is held by a user.

17. The wireless device of claim 14 wherein the held wireless device is held by a holster.

18. The wireless device of claim 14 wherein the processor is further adapted for adjusting a feature of the wireless device in response to the determining.

19. The wireless device of claim 18 wherein the feature is at least one of a ring tone, a display screen time-out, and a display screen illumination intensity.

20. The wireless device of claim 19 wherein the vibration motor and the accelerometer are at least one vibration motor and at least one accelerometer, respectively.

21. A method for determining a restraining force on a wireless device comprising:
   activating a vibration motor in the wireless device to vibrate the wireless device for a predetermined period;
   receiving at least one acceleration measurement from an accelerometer in the wireless device during the predetermined period; and,
   comparing the at least one acceleration measurement to at least one stored acceleration measurement, the at least one stored acceleration measurement corresponding to the restraining force.

22. The method of claim 21 wherein the at least one acceleration measurement and the at least one stored acceleration measurement are an acceleration pattern and a stored acceleration pattern, respectively.

23. The method of claim 21 wherein the wireless device is restrained by at least one of a user's hand, a holster, a pocket, and a surface.

24. The method of claim 21 and further comprising adjusting a feature of the wireless device in response to the comparing.

25. The method of claim 24 wherein the feature is at least one of a ring tone, a display screen time-out, and a display screen illumination intensity.

26. The method of claim 21 wherein the vibration motor and the accelerometer are at least one vibration motor and at least one accelerometer, respectively.

27. The method of claim 21 wherein the vibration motor is a piezoelectric vibration motor.

* * * * *